United States Patent
Omi et al.

(10) Patent No.: US 10,232,250 B2
(45) Date of Patent: Mar. 19, 2019

(54) GAMING PLATFORM PROVIDING A GAME ACTION SWEEP MECHANIC

(71) Applicant: Zynga Inc., San Francisco, CA (US)

(72) Inventors: Gregory Omi, Brisbane, CA (US); Michael McCarthy, Oakland, CA (US); Travis Gorkin, San Francisco, CA (US)

(73) Assignee: Zynga Inc., San Francisco, CA (US)

(*) Notice: Subject to any disclaimer, the term of this patent is extended or adjusted under 35 U.S.C. 154(b) by 1041 days.

(21) Appl. No.: 14/332,914

(22) Filed: Jul. 16, 2014

(65) Prior Publication Data

US 2014/0329596 A1   Nov. 6, 2014

Related U.S. Application Data

(63) Continuation of application No. 13/434,905, filed on Mar. 30, 2012, now Pat. No. 8,795,080.

(51) Int. Cl.
| | |
|---|---|
| *A63F 13/00* | (2014.01) |
| *A63F 13/20* | (2014.01) |
| *G06F 3/0481* | (2013.01) |
| *A63F 13/426* | (2014.01) |
| *A63F 13/533* | (2014.01) |
| *A63F 13/822* | (2014.01) |
| *G06F 3/01* | (2006.01) |

(52) U.S. Cl.
CPC .............. *A63F 13/00* (2013.01); *A63F 13/06* (2013.01); *A63F 13/426* (2014.09);
(Continued)

(58) Field of Classification Search
CPC .......... A63F 13/00; A63F 13/06; A63F 13/20; A63F 13/214; A63F 13/2145;
(Continued)

(56) References Cited

U.S. PATENT DOCUMENTS

| | | |
|---|---|---|
| 6,639,612 B2 | 10/2003 | Bosma et al. |
| 6,901,556 B2 | 5/2005 | Bosma et al. |

(Continued)

OTHER PUBLICATIONS

LizzieK2 4 Elements Level 64 Game Play, YouTube, [Online] Retrieved from the internet: <http://www.youtube.com/watch?v=xILNEHUSnpM ("4 Elements Level 64"), (Jan. 18, 2011).*

(Continued)

*Primary Examiner* — Jasson Yoo
(74) *Attorney, Agent, or Firm* — Schwegman Lundberg & Woessner, P.A.

(57) ABSTRACT

A system, computer-readable storage medium storing at least one program, and a computer-implemented method for providing a game action sweep mechanic are presented. A virtual game environment that includes a first virtual object and a second virtual object may be generated for a user. User interactions involving a game pointer and a selection input are then monitored. In response to detecting the selection input being activated while the game pointer is located proximate to the first virtual object, a game action is then performed on the first virtual object. A game action sweep mode is then activated. While the game action sweep mode is active, the game action is then performed on the second virtual game object in response to detecting the game pointer is located proximate to the second virtual object.

17 Claims, 8 Drawing Sheets

(52) U.S. Cl.
CPC .......... *A63F 13/533* (2014.09); *A63F 13/822* (2014.09); *G06F 3/011* (2013.01); *G06F 3/0481* (2013.01); *G06F 3/04815* (2013.01); *A63F 2300/6045* (2013.01)

(58) Field of Classification Search
CPC ...... A63F 13/42; A63F 13/426; A63F 13/533; A63F 13/822; A63F 2300/6045; A63F 2300/23; A63F 2300/1075; G06F 3/481; G06F 3/048
See application file for complete search history.

(56) References Cited

U.S. PATENT DOCUMENTS

| | | | |
|---|---|---|---|
| 8,302,021 B2 | 10/2012 | Dettinger et al. | |
| 8,795,080 B1* | 8/2014 | Omi | A63F 13/00 463/37 |
| 2007/0060232 A1* | 3/2007 | Sakaguchi | A63F 13/10 463/8 |
| 2007/0265082 A1* | 11/2007 | Shimura | A63F 13/10 463/37 |

OTHER PUBLICATIONS

Fruit Ninja, Wikipedia (https://en.wikipedia.org/wiki/Fruit_Ninja) retrieved on Feb. 12, 2018.*

Fruit Ninja HD for IPad, by Lex Friedman, Macworld, Jul. 29, 2010 (https://www.macworld.com/article/1153028/fruitninjandreview.html).*

Halfbrick launches Fruit Ninja's "Arcade Mode", by George Lim, Nov. 5, 2010 (https://www.imore.com/halfbrick-reveals-fruit-ninjas-arcade-mode).*

Fruit Ninja HD, by Xappreviews, Sep. 8, 2010, (https://www.youtube.com/watch?v=9iW1Asn6Wrs).*

"U.S. Appl. No. 13/434,905 , Response filed Aug. 5, 2013 to Non Final Office Action dated Apr. 3, 2013", 11 pgs.

"U.S. Appl. No. 13/434,905, Corrected Notice of Allowance dated Jun. 2, 2014", 10 pgs.

"U.S. Appl. No. 13/434,905, Examiner Interview Summary dated Feb. 11, 2014", 3 pgs.

"U.S. Appl. No. 13/434,905, Examiner Interview Summary dated Aug. 5, 2013", 3 pgs.

"U.S. Appl. No. 13/434,905, Final Office Action dated Oct. 7, 2013", 13 pgs.

"U.S. Appl. No. 13/434,905, Non Final Office Action dated Apr. 3, 2013", 13 pgs.

"U.S. Appl. No. 13/434,905, Notice of Allowance dated May 23, 2014", 15 pgs.

"U.S. Appl. No. 13/434,905, Response filed Feb. 7, 2014 to Final Office Action dated Oct. 7, 2013", 11 pgs.

Scatingo9, 4 Elements HD—Gameplay Commentary, YouTube, [Online]Retrieved from the Internet: <https://www.youtube.com/watch?v+XKrcTzv_InY>. (Aug. 31, 2011).

* cited by examiner

GAMING PLATFORM PROVIDING A GAME ACTION SWEEP MECHANIC

CLAIM OF PRIORITY

The present application is a continuation of U.S. patent application Ser. No. 13/434,905, filed on Mar. 30, 2012, which is incorporated by reference herein in its entirety.

TECHNICAL FIELD

The present disclosure relates to gaming platforms. In particular, an example gaming platform is provided to perform user initiated game actions.

BACKGROUND

In conventional systems, a user may interact with a virtual game by using a user input device to select various objects displayed in a virtual environment. Each selection of the virtual objects may cause the gaming system to perform a game action on the selected virtual object. For example, in a virtual farming game, a user may harvest a first virtual crop by using a mouse device to position a game pointer proximate to the first virtual crop and then pressing a button on the mouse device (e.g., the left mouse button) to initiate the harvesting game action. To harvest a second virtual crop, the player may repeat the steps used to harvest the first virtual crop. For example, the user may use the mouse device to position the game pointer proximate to the second virtual crop and then press the button on the mouse device (e.g., the left mouse button) to initiate the harvesting game action with respect to the second virtual object.

Thus, in conventional system, repeated game actions are performed responsive to successive user selections.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
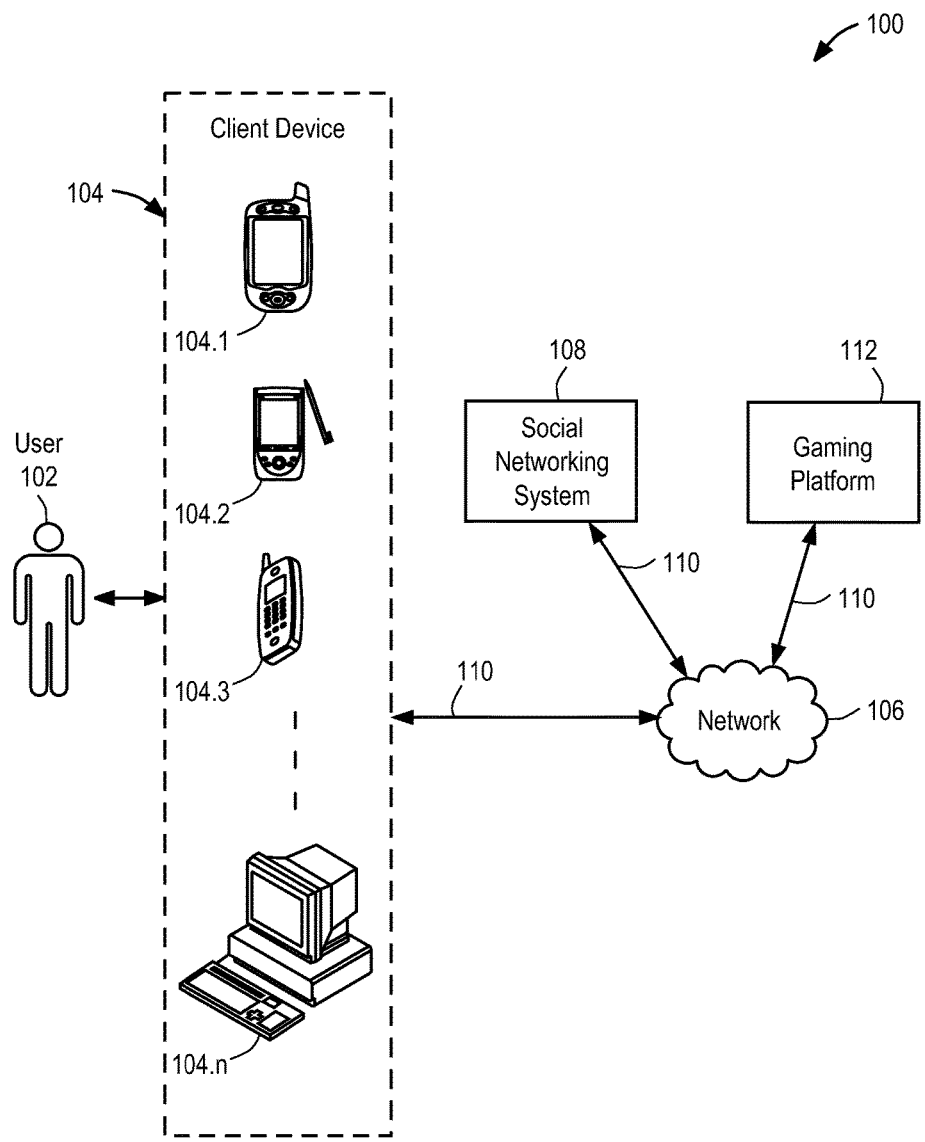
FIG. 1 illustrates an example of a gaming environment for implementing various example embodiments.

Users of computer-implemented systems may access a gaming platform to interact with a virtual environment. For example, through a gaming platform, as provided by Zynga, Inc., a user (e.g., a player) may access a virtual game where a user interacts with a number of virtual objects displayed in virtual environment. To illustrate, the virtual game may display a virtual farming environment that includes a number of virtual crops, avatars, virtual animals, virtual buildings, and the like. Each of the virtual objects (e.g., the virtual crops, the avatars, the virtual animals, the virtual buildings) may be associated with at least one game action. For example, a virtual crop may be associated with a harvest game action such that the player may cause the gaming platform to harvest the virtual crop for virtual currency, experience points, inventory item, and so forth. As a further example, a virtual building may be associated with a collect rent game action such that the player may cause the gaming platform to collect rent from the virtual building.

In example embodiments, a gaming platform may perform a particular game action on the first virtual object. For example, the player may select (e.g., by clicking a mouse button) a virtual crop to cause the game platform to perform a harvest game action. After the game platform harvests the virtual crop, the gaming platform may then enter a game action sweep mode. A "game action sweep mode," as used herein, may refer to any suitable mode of game operation where historical game action information is used to determine whether to perform game actions relative to other virtual objects. Consistent with embodiments described in this disclosure, if the player continues to press down on a mouse button, for example, the game platform may operate according to a game action sweep mode. In this way, the game platform may remain in the game action sweep mode until the player releases the mouse button.

When the gaming platform is in the game action sweep mode, the gaming platform may use location information of a game pointer (e.g., a mouse pointer) to determine whether to perform a particular game action on a second virtual object. For example, while holding the mouse button, the player may use the mouse device to cause the game pointer to be positioned proximate to the second virtual crop. When the gaming platform detects that the game pointer is positioned proximate to the second virtual crop, the gaming platform may perform a harvesting game action on the second virtual crop.

It is to be appreciated that a gaming platform providing a game action sweep mode may find many practical applications. For example, a virtual farming game may provide a game action sweep mode that allows a player to harvest many virtual crops in a comparatively convenient manner. Such is the case because the player is not required to click the game action button on every single virtual crop in a repetitive fashion. Eliminating repetitive user actions may improve a user's enjoyment in a game. Further, eliminating repetitive user actions may reduce the risk of fatigue and physical injury, such as carpel tunnel syndrome. Consequently, some embodiments may provide numerous advantages that improves user experience and, in turn, increases player engagements with a gaming system.

These and other embodiments of the invention are described, by way of example, in further detail below.

Example System

FIG. 1 illustrates an example of a gaming environment 100 for implementing various example embodiments. In some embodiments, the gaming environment 100 comprises a user 102, a client device 104, a network 106, a social networking system 108, and a gaming platform 112. The components of the gaming environment 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Although FIG. 1 illustrates a particular example of the arrangement of the user 102, the client device 104, the social networking system 108, the gaming platform 112, and the network 106, any suitable arrangement or configuration of the user 102, the client device 104, the social networking system 108, the gaming platform 112, and the network 106 may be contemplated.

The client device 104 may be any suitable computing device (e.g., devices 104.1-104.$n$), such as a smart phone 104.1, a personal digital assistant 104.2, a mobile phone 104.3, a personal computer 104.$n$, a laptop, a computing tablet, or any other device suitable for playing a virtual game. The client device 104 may access the social networking system 108 or the gaming platform 112 directly, via the network 106, or via a third-party system. For example, the client device 104 may access the gaming platform 112 via the social networking system 108.

In some embodiments, the client device 104 may be communicatively coupled to or include an input device, such as a keyboard, a pointing device, and a display device (not shown). Such input devices may allow a user to interact with a game provided by the gaming platform 112. For example, with the input devices, the client device 104 may allow a user to select (e.g., through a mouse click or a finger tap on a touch screen) a virtual object. Selecting a virtual object may cause the gaming platform 112 to perform a game action on the selected virtual object.

The social networking system 108 may include a network-addressable computing system that can host one or more social graphs (see for example FIG. 2), and may be accessed by the other components of system 100 either directly or via the network 106. The social networking system 108 may generate, store, receive, and transmit social networking data.

Figure 2:
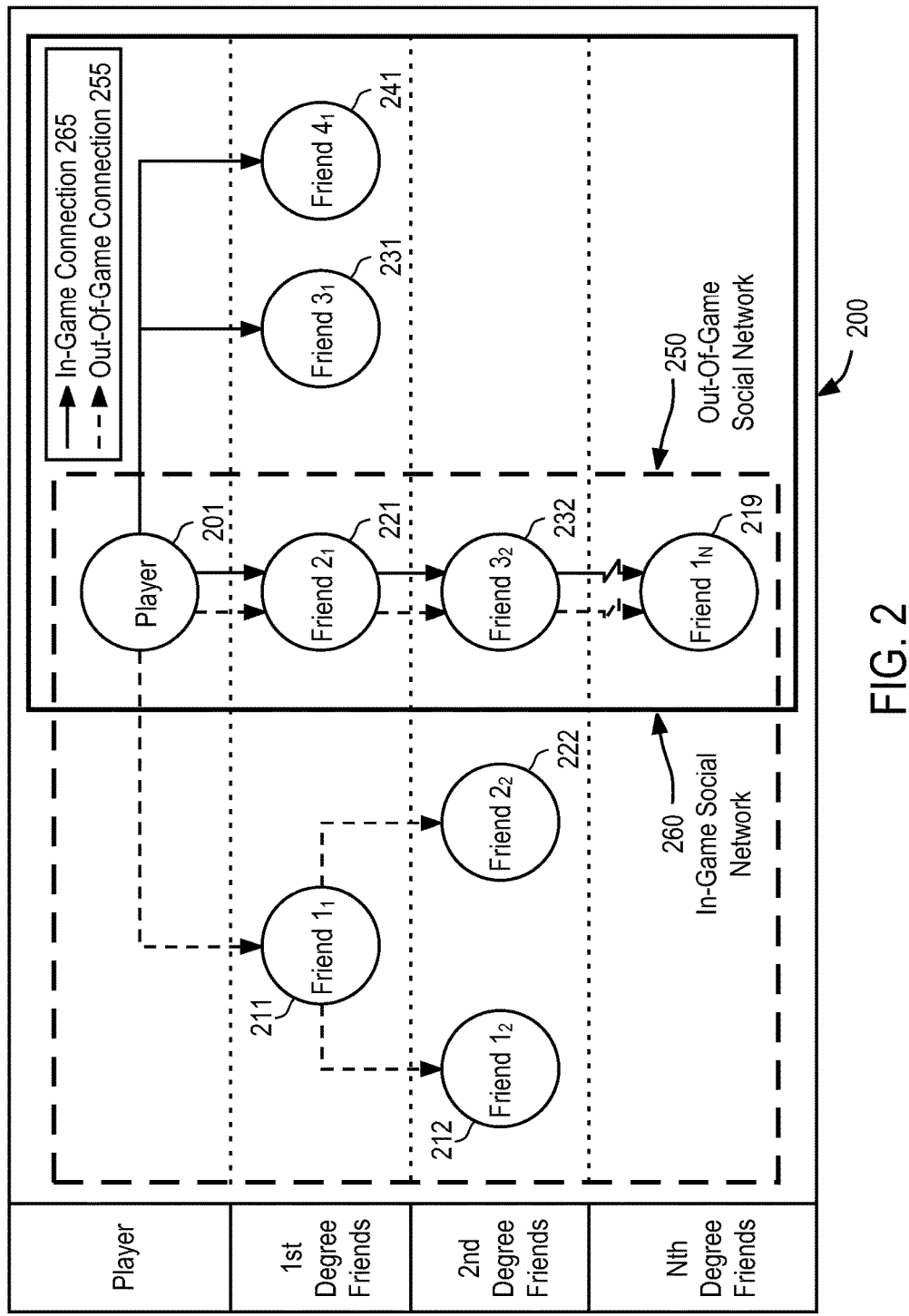
FIG. 2 illustrates an example of a social network within a social graph, according to some embodiments.

FIG. 2 shows an example of a social network within a social graph 200. The social graph 200 is shown by way of example to include an out-of-game social network 250 and an in-game social network 260. Moreover, the in-game social network 260 may include one or more users that are friends with Player 201 (e.g., Friend $3_1$ 231), and may include one or more other users that are not friends with Player 201. The social graph 200 may correspond to the various users associated with the virtual game. In an example embodiment, each user may "build" their own virtual structures using branded virtual objects and/or unbranded virtual objects. A "branded virtual object" may refer to a virtual object that may be customizable with a logo, image, text, or any other customizable feature. When, for example, Player 201 visits the virtual environment of Friend $3_1$ 231, the virtual environment displayed to Player 201 includes banded objects selected and placed in that environment by Friend $3_1$ 231.

With reference back to FIG. 1, the gaming platform 112 may include a network-addressable computing system (or systems) that can host one or more virtual games, for example, online games. The gaming platform 112 may generate, store, receive, and transmit game-related data, such as, for example, game account data, game input, game state data, and game displays. The gaming platform 112 may be accessed by the other components of the gaming environment 100 either directly or via the network 106. The user 102 may use the client device 104 to access, send data to, and receive data from the social networking system 108 and/or the gaming platform 112.

Figure 3:
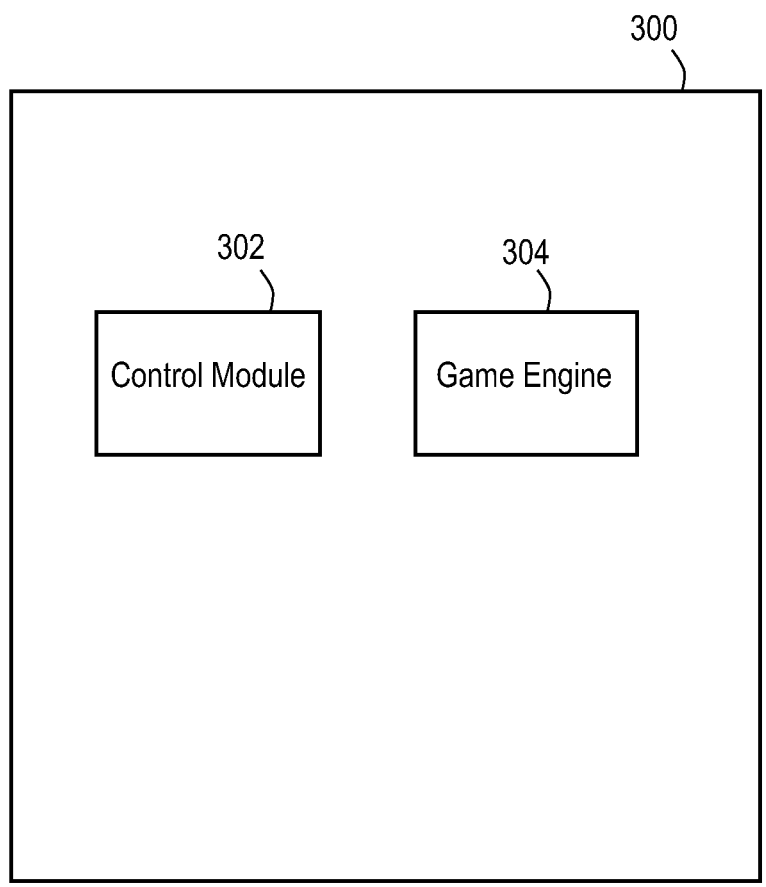
FIG. 3 is a block diagram depicting various modules, in accordance with example embodiments, that may be included in a processing system.

FIG. 3 is a block diagram depicting various modules, in accordance with example embodiments, that may be included in a processing system 300. It should be appreciated that the processing system 300 may be deployed in the form of, for example, a server computer, a client computer, a personal computer, a laptop computer, a mobile phone, a personal digital assistant, and other processing systems. For example, in one embodiment, the processing system 300 may be embodied as the gaming platform 112 of the gaming environment 100 depicted in FIG. 1. In an alternate embodiment, the processing system 300 may be embodied as the client device 104 of the gaming environment 100. As a further example, in yet another embodiment, the processing system 300 may be embodied as a combination of the gaming platform 112 and the client device 104 of the gaming environment 100 depicted in FIG. 1. Referring to FIG. 3, in various embodiments, the processing system 300 may be used to implement computer programs, logic, applications, methods, processes, or software to provide a game action sweep mechanic, as described in more detail below.

A control module 302 may be configured to translate user input into game actions that are to be performed by a game engine 304. For example, consistent with embodiments described in this disclosure, the control module 302 may receive user input data that signals that a virtual object has been selected. Responsive to receiving the user input data, the control module 302 may cause the game engine to perform a particular game action on the selected virtual object. Further, the control module 302 may detect whether the user has initiated a game action sweep mode that allows the player to perform subsequent game actions on other virtual objects without having to manually select the other virtual objects. The game action sweep mode is described in more detail below.

The game engine module 304, according to various embodiments, may be configured to perform operations related to generating, storing, receiving, and transmitting game-related data, such as, for example, game account data, game input, game state data, and game displays. In example embodiments, the game engine module 304 may perform the operations related to generating, storing, receiving, and transmitting game-related data responsive to receiving game actions from the control module 302.

It should be appreciated that in other embodiments, the processing system 300 may include fewer, more, or different modules apart from those shown in FIG. 3. For example, in an alternate embodiment, control module 302 and the game engine module 302 may be combined into one module. In another embodiment, the control module 302 can be separate from and executed or processed in parallel with the game engine module 302.

Figure 4:
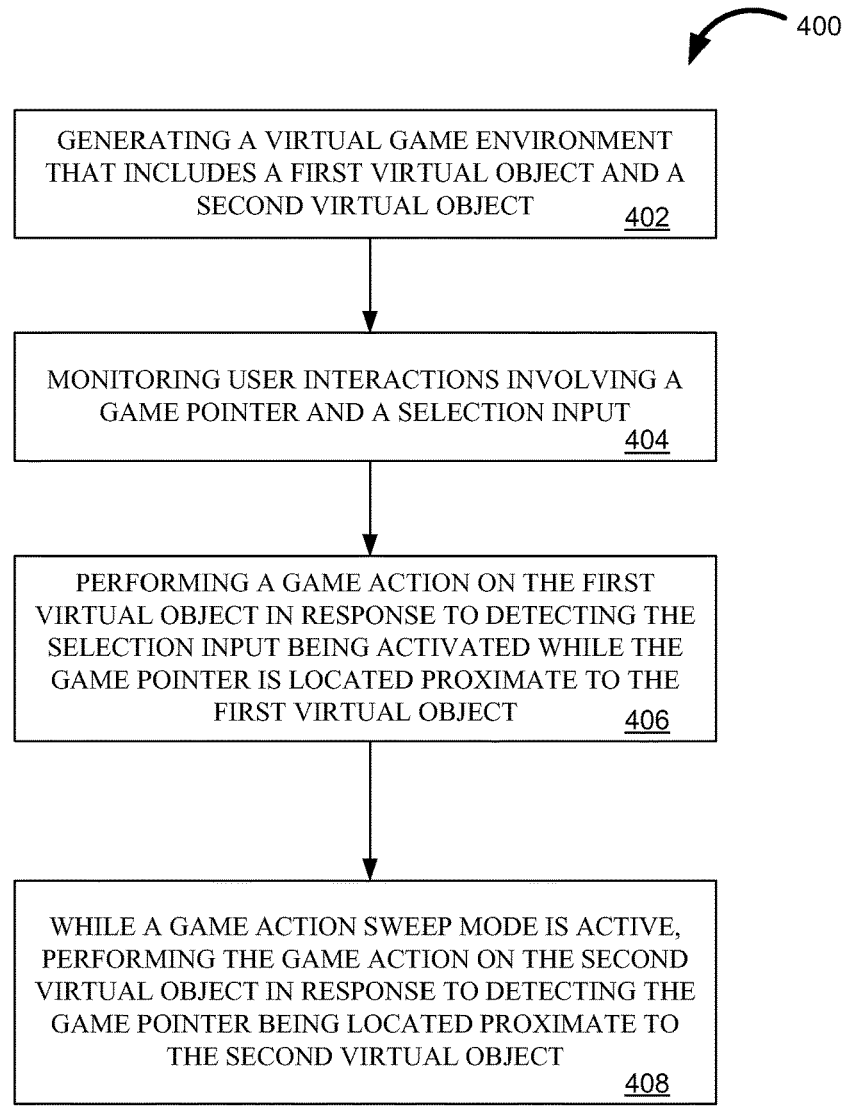
FIG. 4 is a flow chart illustrating a method of performing a game action sweep across a multitude of virtual objects, according to an example embodiment.

FIG. 4 is a flow chart illustrating a method 400 of performing a game action sweep across a multitude of virtual objects, according to an example embodiment. In an embodiment, the method 400 may be implemented by the components and modules shown in FIGS. 1 and 3.

As depicted in FIG. 4, the method 400 may begin at operation 402 when the method 400 generates a virtual game environment that includes a first virtual object and a second virtual object. By way of example and not limitation, generating the virtual game environment may involve displaying the virtual game environment on the client device 104. The virtual game environment, in some embodiments, may depict a landscape, building, city, game board, or any other environment. In turn, the first and second virtual objects may depict interactive elements within the virtual game environment, such as crops, buildings, characters, tiles, game board pieces, or any other suitable elements.

At operation 404, the method 400 then monitors user interactions involving a game pointer and a selection input. As used herein, a "game pointer" may refer to any suitable user input element that identifies a location within the virtual game environment. By way of example and not limitation, a mouse cursor is an example of a game pointer contemplated by some embodiments described in this disclosure. In another example, a touch screen may allow a player to move a game pointer within the virtual game environment via physical contact with a display screen. Further, as used herein, a "selection input" may refer to any suitable user input element that signals that a game action is to be performed. For example, in some embodiments, a player may click a button provided by a mouse device and, in other embodiments, the player may double tap a touch screen input device. When a selection input is activated (e.g., a mouse button is pressed or a touch screen is taped), the control module 302 may obtain contextual information, such as a location of the game pointer and the virtual object corresponding to the location, to determine which game action that is to be performed.

At operation 406, the method 400 performs a game action on the first virtual object in response to detecting the selection input being activated while the game pointer is located proximate to the first virtual object. In some embodiments, the game action is performed when the control module 302 detects that the selection input is activated. Upon detection that the selection input is activated, the control module 302 may obtain the location of the game pointer determine which virtual object was selected by the player. Once the virtual object is identified, the control module 302 may infer the game action from contextual data associated with the virtual object (e.g., a default game action given the state of the virtual object) or solicit a selection from the user (e.g., via a menu associated, at least in part, with the virtual game object). As an illustration of operation 406, the player may move a mouse cursor over a virtual crop and then click on a mouse button to cause the gaming platform 112, the control module 302, and/or the game engine module 304 to perform a harvest game action on the selected virtual crop.

At operation 408, the method 400 performs the game action on the second virtual object in response to detecting the game pointer being located proximate to the second virtual object. As FIG. 4 shows, operation 408 is performed while the virtual game is in a game action sweep mode. To activate the game action sweep mode, the game control module 302, for example, may monitor user interactions to determine whether the player has deactivated the selection input detected at operation 406. Releasing a mouse button or removing contact from a touch screen device are examples of deactivating the selection input. If the game control module 302 detects that the selection input has not been deactivated, then the game control module 302 may operate in game action sweep mode. While in game action sweep mode, the game control module 302 may cause the game engine module 304 to perform particular game action based on the location of the game pointer. In some embodiments, the game action that is performed matches the game action performed as part of operation 406. For example, if the player places the game pointer proximate to another virtual crop, the control module 302 may cause the game engine module 304 to perform a harvest game action on the other virtual crop.

It is to be appreciated that such a second game action occurs without the player re-activating (clicking on the mouse button or tapping a touch screen a second time) the selection input. In this way, some embodiments may provide a comparatively efficient mechanism for a player to perform a type of game action on multiple virtual objects within a virtual game. Such efficiencies may improve a user experience and, in turn, may increase player interactions with a game hosted in a gaming environment.

Figure 5:
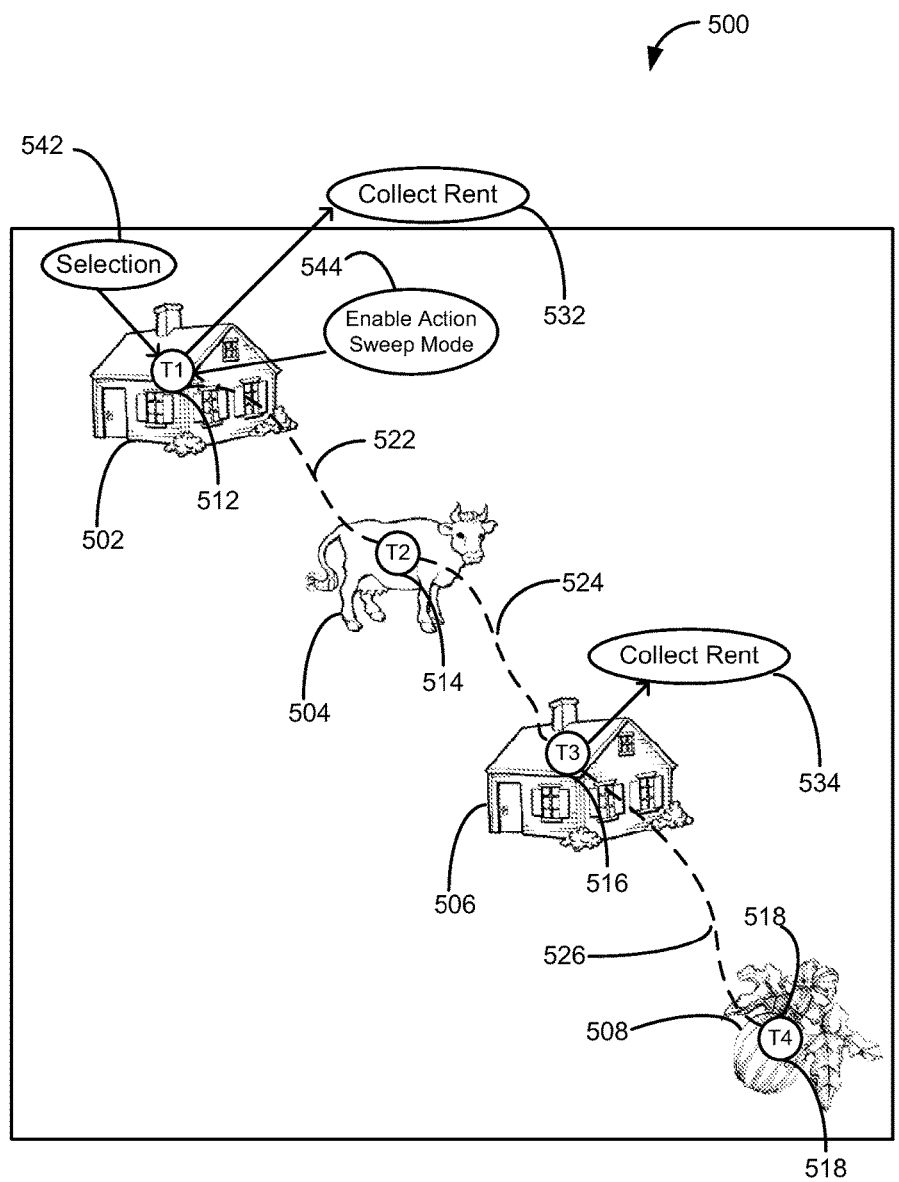
FIG. 5 is a diagram that illustrates user interactions with an example virtual game environment, according to example embodiments.

FIG. 5 is a diagram that illustrates user interactions with an example virtual game environment 500, according to example embodiments. The virtual game environment 500 includes a number of virtual objects, such as virtual buildings 502, 506, a virtual farm animal 504, and a virtual crop 508. Each of the virtual objects (e.g., the virtual buildings 502, 506, the virtual farm animal 504, and the virtual crop 508) may be associated with corresponding game actions. By way of illustration, the virtual buildings 502, 506 may each be associated with a collect rent game action. Further, the virtual farm animal 504 and the virtual crop 508 may each be associated with a harvest game action.

FIG. 5 also shows game pointer positions 512, 514, 516, and 518. Each game pointer position may represent a particular position of a game pointer at a relative point in time. For example, the game pointer position 512 may be associated with the first point in time ($T_1$), the game pointer position 514 may be associated with a second point in time ($T_2$), the game pointer position 516 may be associate with the third point in time ($T_3$), and the game pointer position 518 may be associated with a fourth point in time ($T_4$). It is to be appreciated that the game pointer positions 512, 514, 516, and 518 may designate any suitable location associated with a corresponding virtual object. For example, in some embodiments, the game pointer position 512 may be located proximate to the virtual building 502. The term "proximate," as used herein, may refer to a location that is over or within a determinable distance from the virtual object. In some embodiments, a determinable distance may be measured relative to a threshold distance, for example.

To illustrate a path that the game pointer traverses over time, the game pointer positions 512, 514, 516, 518 are connected by game pointer paths 522, 524, 526. For example, at some point between times $T_1$ and $T_2$, a user may cause the gaming platform 112 to traverse the game pointer along the pointer path 522. Further, from time $T_2$ to time $T_3$, a player may cause the gaming platform 112 to traverse the game pointer along the pointer path 524. Still further, from time $T_3$ to time $T_4$, a player may cause the gaming platform 112 to traverse the game pointer along the pointer path 526.

Operationally, at time $T_1$, a game pointer may begin at the game pointer position 512. At the game pointer position 512, the player may initiate a selection input (e.g., pressing a left or right button on a mouse or, in some embodiments, tapping a touch screen enabled client device) that is then received by the input module 302. In some embodiments, the selection input 542 may include location information, virtual object data (e.g., a virtual object identifier), game action data (e.g., a game action identifier), or some combination thereof. In other embodiments, the input module 302 may derive some or all of the data for the selection input 542. For example, the selection input 542 may include location information and from the location information, the input module 542 may derive the virtual object corresponding to the location and the game actions associated with the corresponding virtual object.

Using the selection input 542, the gaming platform 112 may then cause the game action 532 to be performed on the virtual building 502. For example, as shown in FIG. 5, the game action 532 may correspond to collecting rent from the virtual building 502. Accordingly, the input module 302 may send the selection input 542 to the game engine 304 and the game engine 304 may update the game state to reflect that the rent has been collected for the building 502.

As FIG. 5 shows, in some cases, the player may then initiate or otherwise enable a game action sweep mode, as shown by game action sweep mode input 544. When the game action sweep mode input 544 is received, the input module 302 may enable the game action sweep mode which may allow additional game actions to be performed independent of receiving another selection inputs, such as selection input 542. For example, as is described below, while game action sweep mode is enabled, the gaming platform 112 may perform additional game actions if the game pointer is located proximate to a virtual object that can perform the same or similar game actions previously performed in response to the selection input 542. As part of enabling the game action sweep mode, the input module 302 may associate a type of game action or type of virtual object with the game action sweep mode. The control module 302 may then apply subsequent game actions to other virtual objects based on the location of the game pointer and the type of game action and/or the type of the virtual object associated with the game action sweep mode.

After the game action sweep mode is enabled, the player may cause the game pointer to transition from game pointer position 512 to game pointer position 514 along the game pointer path 522. At game pointer position 514, the input module 302 may determine that the virtual farm animal 504 does not support the game action associated with the game action sweep mode. That is, the gaming platform may prohibit the 'collect rent' game action from being applied to the virtual farm animal 504. Accordingly, the gaming platform may determine that no game action be performed based on the game pointer being located proximate to virtual farm animal 504.

The player may then cause the game pointer to transition from position 514 to position 516 along the game pointer path 526. At game pointer position 516, the input module 302 may determine that the virtual building 506 does support the game action associated with action sweep mode. That is, the gaming platform 112 may permit the 'collect rent' game action to be performed on the virtual building 506. Accordingly, the input module 302 may determine that the 'collect rent' game action 534 is to be performed on the virtual building 506 based on the game pointer being located proximate to the virtual building 506 and the game action sweep mode being enabled.

The player may then cause the game pointer to transition from game pointer position 516 to game pointer position 518 along game pointer path 526. At game pointer position 518, the input module 302 may determine that the virtual crop 508 does not support a game action associated with the game action sweep mode. That is, the virtual crop 508 may lack the ability to perform a 'collect rent' game action. Accordingly, the input module 302 may determine, even while in game action sweep mode, that no game action is to be performed based on the game pointer being located proximate to the virtual crop 508.

FIG. 5 illustrates that once the player initiates a game action sweep mode, the game action associated with the game action sweep mode may then be conditionally applied to other virtual objects based on the location of the game pointer. In some embodiments, one such condition may be whether the virtual game object collocated with the game pointer is of the same type as the virtual game object used to initiate the game action sweep mode. For example, with reference to FIG. 5, the game action sweep module may determine whether each of the virtual object types associated with the virtual objects 504, 506, 508 matches the virtual object type associated virtual object 502.

Figure 6:
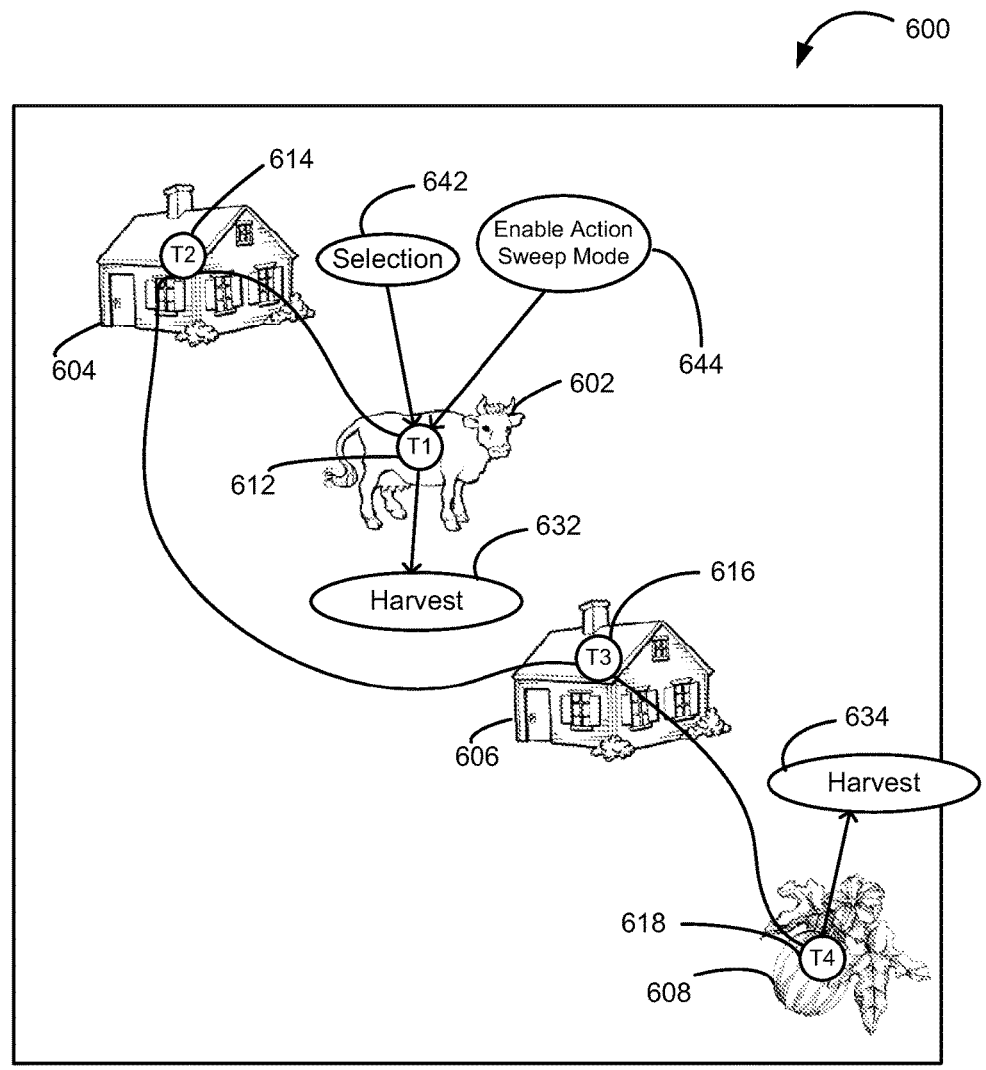
FIG. 6 is a diagram illustrating a game action sweep mode conditioned on the game actions available to a particular virtual object, according to an example embodiment.

FIG. 6 is a diagram illustrating a game action sweep mode conditioned on the game actions available to a particular virtual object, according to an example embodiment. For example, a virtual game environment 600 includes virtual buildings 604, 606, a virtual animal 602, and a virtual crop 608. At game pointer position 612, the player may activate a selection input 642 that is detected by the control module 302. In turn, the control module 302 may cause the game engine module 304 to perform the harvest game action on the virtual animal 602. Further, the game control 302 may detect that the player has activated the game action sweep mode 644.

As the player moves the game pointer proximate to the virtual buildings 604, 606, the control module 302 may detect that the harvest game action 634 is not supported by the virtual buildings 606. Accordingly, the control module 304 will not perform a game action in response to being located proximate to the virtual buildings 604, 606.

However, as the player positions the game pointer proximate to game pointer position 618, the control module 302 may detect that the virtual crop 608 supports the harvest game action. Accordingly, even though the virtual animal 602 and the virtual crop 608 are different types of virtual objects, the control module may cause the game engine module 304 to perform the harvest game action 634 on the virtual crop.

Example Game Systems, Social Networks, and Social Graphs

As described above, the systems described herein may include, communicate, or otherwise interact with a game system. As such, the game system is now described to illustrate further embodiments. In an online multiuser game, users control player characters (PCs), a game engine controls non-player characters (NPCs), and the game engine also manages player character state and tracks states for currently active (e.g., online) users and currently inactive (e.g., offline) users.

A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a user (or a group of more than one users), the game engine may take into account the state of the player character (or group of player characters (PCs)) that is playing, but also the state of one or more PCs of offline/inactive users who are connected to the current user (or PC, or group of PCs) through the game social graph but are not necessarily involved in the game at the time.

For example, User A with six friends on User A's team (e.g., the friends that are listed as being in the user's mob/gang/set/army/business/crew/etc. depending on the nature of the game) may be playing the virtual game and choose to confront User B who has 20 friends on User B's team. In some embodiments, a user may only have first-degree friends on the user's team. In other embodiments, a user may also have second-degree and higher degree friends on the user's team. To resolve the game event, in some embodiments the game engine may total up the weapon strength of the seven members of User A's team and the weapon strength of the 21 members of User B's team and decide an outcome of the confrontation based on a random variable applied to a probability distribution that favors the side with the greater total. In some embodiments, all of this may be done without any other current active participants other than User A (e.g., User A's friends, User, B, and User B's friends could all be offline or inactive). In some embodiments, the friends in a user's team may see a change in their state as part of the outcome of the game event. In some embodiments, the state (e.g., assets, condition, level) of friends beyond the first degree are taken into account.

Example Gaming Platforms

A virtual game may be hosted by the gaming platform 112, which can be accessed using any suitable connection 110 with a suitable client device 104. A user may have a game account on the gaming platform 112, wherein the game account may contain a variety of information associated with the user (e.g., the user's personal information, financial information, purchase history, player character state, game state, etc.). In some embodiments, a user may play multiple games on the gaming platform 112, which may maintain a single game account for the user with respect to the multiple games, or multiple individual game accounts for each game with respect to the user. In some embodiments, the gaming platform 112 may assign a unique identifier to a user 102 of a virtual game hosted on the gaming platform 112. The gaming platform 112 may determine that the user 102 is accessing the virtual game by reading the user's cookies, which may be appended to HTTP requests transmitted by the client device 104, and/or by the user 102 logging onto the virtual game.

In some embodiments, the user 102 accesses a virtual game and control the game's progress via the client device 104 (e.g., by inputting commands to the game at the client device 104). The client device 104 can display the game interface, receive inputs from the user 102, transmit user inputs or other events to the game engine, and receive instructions from the game engine. The game engine can be executed on any suitable system (such as, for example, the client device 104, the social networking system 108, or the gaming platform 112). For example, the client device 104 may download client components of a virtual game, which are executed locally, while a remote game server, such as the gaming platform 112, provides backend support for the client components and may be responsible for maintaining application data of the game, processing the inputs from the user 102, updating and/or synchronizing the game state based on the game logic and each input from the user 102, and transmitting instructions to the client device 104. As another example, when the user 102 provides an input to the game through the client device 104 (such as, for example, by typing on the keyboard or clicking the mouse of the client device 104), the client components of the game may transmit the user's input to the gaming platform 112.

In some embodiments, the user 102 accesses particular game instances of a virtual game. A game instance is a copy of a specific game play area that is created during runtime. In some embodiments, a game instance is a discrete game play area where one or more users 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more in-game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of in-game actions available to a specific user is different in a game instance that is associated with this user compared to a game instance that is not associated with this user. The set of in-game actions available to a specific user in a game instance associated with this user may be a subset, superset, or independent of the set of in-game actions available to this user in a game instance that is not associated with him. For example, a first user may be associated with Blackacre Farm in an online farming game, and may be able to plant crops on Blackacre Farm. If the first user accesses a game instance associated with another user, such as Whiteacre Farm, the game engine may not allow the first user to plant crops in that game instance. However, other in-game actions may be available to the first user, such as watering or fertilizing crops on Whiteacre Farm.

In some embodiments, a game engine interfaces with a social graph. Social graphs are models of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the gaming platform 112, which is managed by the game operator. In other embodiments, the social graph is part of a social networking system 108 managed by a third party (e.g., Facebook, Friendster, Myspace). In yet other embodiments, the user 102 has a social network on both the gaming platform 112 and the social networking system 108, wherein the user 102 can have a social network on the gaming platform 112 that is a subset, superset, or independent of the user's social network on the social networking system 108. In such combined systems, game network system 112 can maintain social graph information with edge-type attributes that indicate whether a given friend is an "in-game friend," an "out-of-game friend," or both. The various embodiments disclosed herein are operable when the social graph is managed by the social networking system 108, the gaming platform 112, or both.

Example Systems and Methods

Returning to FIG. 2, the User 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to User 201. As used herein, the terms "user" and "player" can be used interchangeably and can refer to any user in an online multiuser game system or social networking system. As used herein, the term "friend" can mean any node within a user's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In the social graph 200, it is possible for individuals to be connected to other individuals through their first-degree friends (e.g., friends of friends). As described above, the number of edges in a minimum path that connects a user to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a user (or player character) has a social graph within an online multiuser game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of users, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a user's in-game social network is formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that can be the case.

Figure 7:
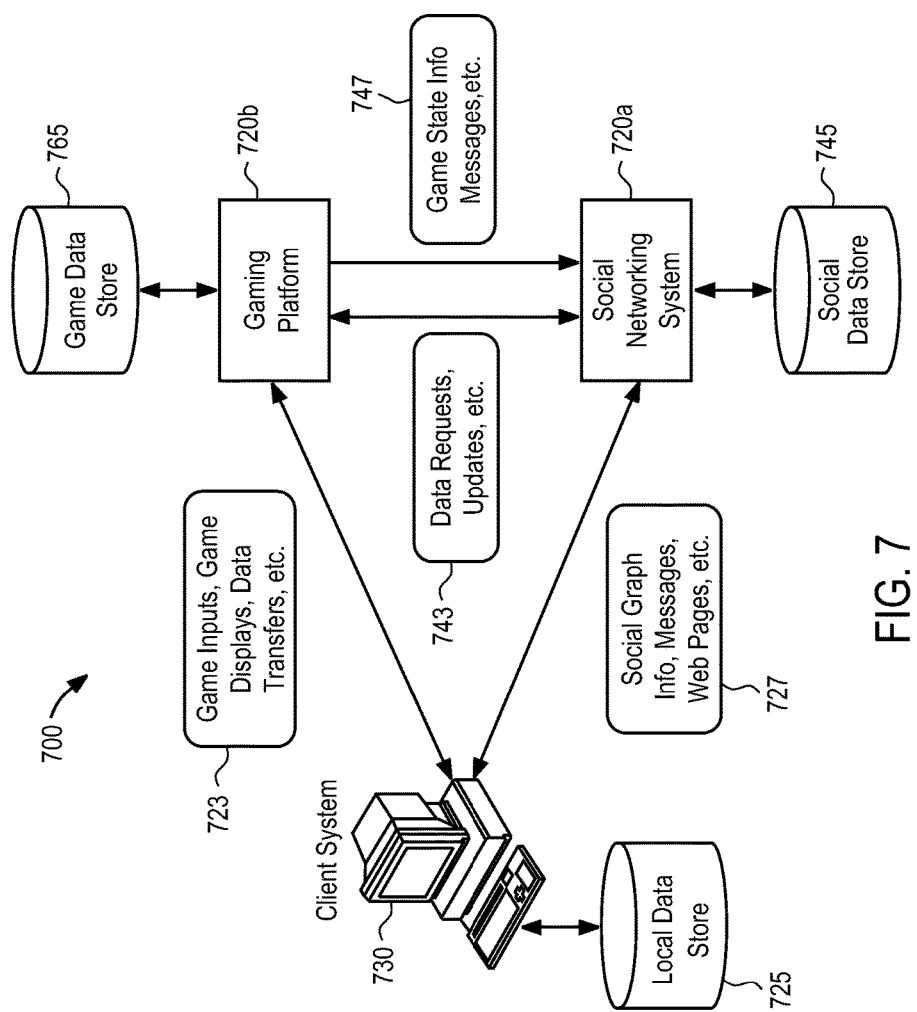
FIG. 7 illustrates an example data flow between example components of the example system of FIG. 1, according to some embodiments.

FIG. 7 illustrates an example data flow between example components of an example system 700. One or more of the components of the example system 700 may correspond to one or more of the components of the example gaming environment 100. In some embodiments, the system 700 includes a client system 730, a social networking system 720a, and a gaming platform 720b. The components of system 700 can be connected to each other in any suitable configuration, using any suitable type of connection. The components may be connected directly or over any suitable network. The client system 730, the social networking system 720a, and the gaming platform 720b may have one or more corresponding data stores such as local data store 725, social data store 745, and game data store 765, respectively.

The client system 730 may receive and transmit data 723 to and from the gaming platform 720b. This data can include, for example, a web page, a message, a game input, a game display, a HTTP packet, a data request, transaction information, and other suitable data. At some other time, or at the same time, the gaming platform 720b may communicate data 743, 747 (e.g., game state information, game system account information, page info, messages, data requests, updates) with other networking systems, such as the social networking system 720a (e.g., Facebook, Myspace). The client system 730 can also receive and transmit data 727 to and from the social networking system 720a. This data can include, for example, web pages, messages, social graph information, social network displays, HTTP packets, data requests, transaction information, updates, and other suitable data.

Communication between the client system 730, the social networking system 720a, and the gaming platform 720b can occur over any appropriate electronic communication medium or network using any suitable communications protocols. For example, the client system 730, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the gaming platform 720b, the BLOB containing the game state for the instance corresponding to the user may be transmitted to the client system 730 for use by a client-side executed object to process. In some embodiments, the client-side executable is a FLASH-based game, which can de-serialize the game state data in the BLOB. As a user plays the game, the game logic implemented at the client system 730 maintains and modifies the various game state parameters locally. The client-side game logic may also batch game events, such as mouse clicks, and transmit these events to the gaming platform 720b. Gaming platform 720b may itself operate by retrieving a copy of the BLOB from a database or an intermediate memory cache (memcache) layer. The gaming platform 720b can also de-serialize the BLOB to resolve the game state parameters and execute its own game logic based on the events in the batch file of events transmitted by the client to synchronize the game state on the server side. The gaming platform 720b may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 730. For example, a client application downloaded to the client system 730 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages is associated with or accessed by the social networking system 720a. This disclosure contemplates using any suitable application for the retrieval and rendering of structured documents hosted by any suitable network-addressable resource or website.

Application event data of a game is any data relevant to the game (e.g., user inputs). In some embodiments, each application datum may have a name and a value, and the value of the application datum may change (e.g., be updated) at any time. When an update to an application datum occurs at the client system 730, either caused by an action of a game user or by the game logic itself, the client system 730 may need to inform the gaming platform 720b of the update. For example, if the game is a farming game with a harvest mechanic (such as Zynga FarmVille), an event can correspond to a user clicking on a parcel of land to harvest a crop. In such an instance, the application event data may identify an event or action (e.g., harvest) and an object in the game to which the event or action applies.

In some embodiments, one or more objects of a game is represented as an Adobe Flash object. Flash may manipulate vector and raster graphics, and supports bidirectional streaming of audio and video. "Flash" may mean the authoring environment, the user, or the application files. In some embodiments, the client system 730 may include a Flash client. The Flash client may be configured to receive and run Flash application or game object code from any suitable networking system (such as, for example, the social networking system 720a or the gaming platform 720b). In some embodiments, the Flash client is run in a browser client executed on the client system 730. A user can interact with Flash objects using the client system 730 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, attack, shoot, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user at the client system 730, the Flash client may send the events that caused the game state changes to the in-game object to the gaming platform 720b. However, to expedite the processing and hence the speed of the overall gaming experience, the Flash client may collect a batch of some number of events or updates into a batch file. The number of events or updates may be determined by the Flash client dynamically or determined by the gaming platform 720b based on server loads or other factors. For example, client system 730 may send a batch file to the gaming platform 720b whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 730, the gaming platform 720b serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, gaming platform 720b may retrieve the corresponding BLOB from the database to determine the most-recent values of the game-related data. In some embodiments, while a user is playing the virtual game, the gaming platform 720b also loads the corresponding BLOB into a memory cache so that the game system may have faster access to the BLOB and the game-related data contained therein.

Figure 8:
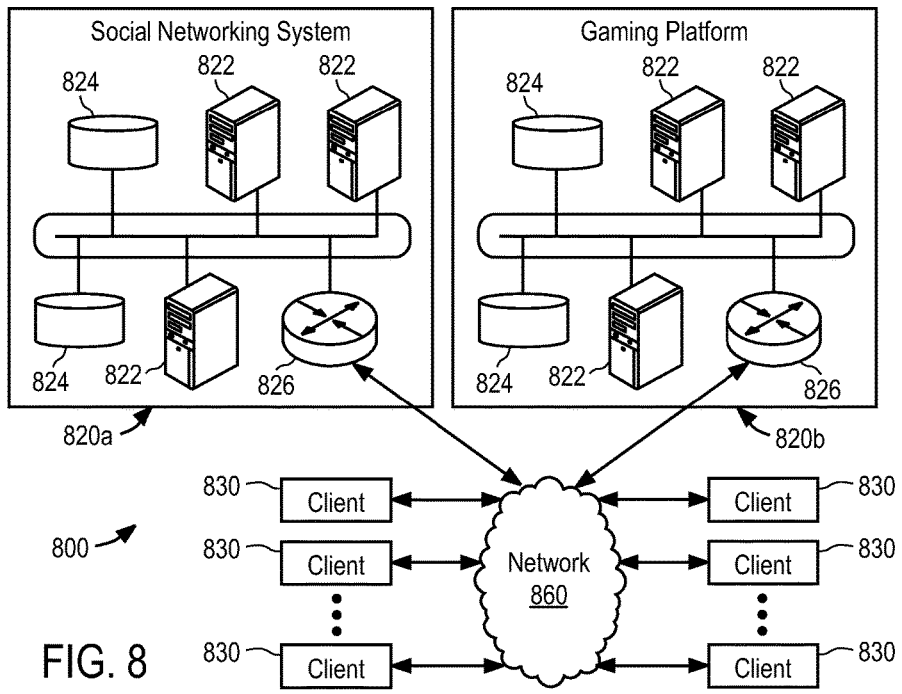
FIG. 8 illustrates an example network environment, in which various example embodiments may operate.

Various embodiments may operate in a wide area network environment, such as the Internet, including multiple network addressable systems. FIG. 8 illustrates an example network environment 800, in which various example embodiments may operate. Network cloud 860 generally represents one or more interconnected networks, over which the systems and hosts described herein can communicate. The network cloud 860 may include packet-based wide area networks (such as the Internet), private networks, wireless networks, satellite networks, cellular networks, paging networks, and the like. As FIG. 8 illustrates, various embodiments may operate in a network environment 800 comprising one or more networking systems, such as a social networking system 820a, a gaming platform 820b, and one or more client systems 830. The components of the social networking system 820a and the gaming platform 820b operate analogously; as such, hereinafter they may be referred to simply as the networking system 820. The client systems 830 are operably connected to the network environment 800 via a network service provider, a wireless carrier, or any other suitable means.

The networking system 820 is a network addressable system that, in various example embodiments, comprises one or more physical servers 822 and data stores 824. The one or more physical servers 822 are operably connected to the computer network cloud 860 via, by way of example, a set of routers and/or networking switches 826. In an example embodiment, the functionality hosted by the one or more physical servers 822 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 822 may host functionality directed to the operations of the networking system 820. Hereinafter, the servers 822 may be referred to as server 822, although the server 822 may include numerous servers hosting, for example, the networking system 820, as well as other content distribution servers, data stores, and databases. The data store 824 may store content and data relating to, and enabling, operation of, the networking system 820 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, the data store 824 corresponds to one or more of a variety of separate and integrated databases, such as relational databases and object-oriented databases that maintain information as an integrated collection of logically related records or files stored on one or more physical systems. Structurally, the data store 824 may generally include one or more of a large class of data storage and management systems. In some embodiments, the data store 824 may be implemented by any suitable physical system(s) including components, such as one or more database servers, mass storage media, media library systems, storage area networks, data storage clouds, and the like. In one example embodiment, the data store 824 includes one or more servers, databases (e.g., MySQL), and/or data warehouses. Data store 824 may include data associated with different networking system 820 users and/or client systems 830.

The client system 830 is generally a computer or computing device including functionality for communicating (e.g., remotely) over a computer network. The client system 830 may be a desktop computer, laptop computer, personal digital assistant (PDA), in- or out-of-car navigation system, smart phone or other cellular or mobile phone, or mobile gaming device, among other suitable computing devices. The client system 830 may execute one or more client applications, such as a Web browser.

When a user at the client system 830 desires to view a particular webpage (hereinafter also referred to as target structured document) hosted by the networking system 820, the user's web browser, or other document rendering engine or suitable client application, formulates and transmits a request to the networking system 820. The request generally includes a URL or other document identifier as well as metadata or other information. By way of example, the request may include information identifying the user, a timestamp identifying when the request was transmitted, and/or location information identifying a geographic location of the user's client system 830 or a logical network location of the user's client system 830.

Although the example network environment 800 described above and illustrated in FIG. 8 is described with respect to the social networking system 820a and the gaming platform 820b, this disclosure encompasses any suitable network environment using any suitable systems. For example, a network environment may include online media systems, online reviewing systems, online search engines, online advertising systems, or any combination of two or more such systems.

Figure 9:
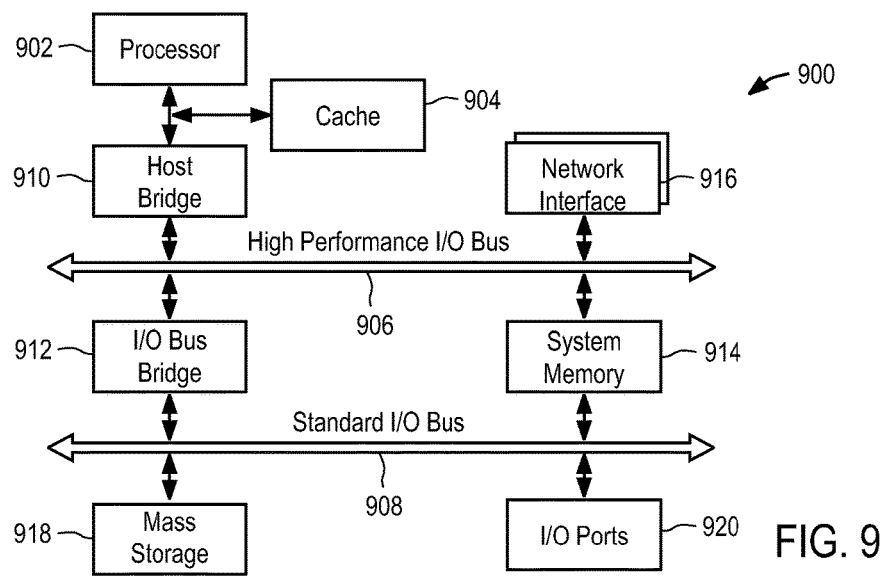
FIG. 9 illustrates an example computing system architecture, which may be used to implement one or more of the methodologies described herein, according to some embodiments.

FIG. 9 illustrates an example computing system architecture, which may be used to implement a server 922 or a client system 930. In one embodiment, the hardware system 900 comprises a processor 902, a cache memory 904, and one or more executable modules and drivers, stored on a tangible computer-readable storage medium, directed to the functions described herein. Additionally, the hardware system 900 may include a high performance input/output (I/O) bus 906 and a standard I/O bus 908. A host bridge 910 may couple the processor 902 to the high performance I/O bus 906, whereas the I/O bus bridge 912 couples the two buses 906 and 908 to each other. A system memory 914 and one or more network/communication interfaces 916 may couple to the bus 906. The hardware system 900 may further include video memory (not shown) and a display device coupled to the video memory. Mass storage 918 and I/O ports 920 may couple to the bus 908. The hardware system 900 may optionally include a keyboard, a pointing device, and a display device (not shown) coupled to the bus 908. Collectively, these elements are intended to represent a broad category of computer hardware systems.

The elements of the hardware system 900 are described in greater detail below. In particular, the network interface 916 provides communication between the hardware system 900 and any of a wide range of networks, such as an Ethernet (e.g., IEEE 802.3) network, a backplane, etc. The mass storage 918 provides permanent storage for the data and programming instructions to perform the above-described functions implemented in servers 922 of FIG. 8, whereas system memory 914 (e.g., DRAM) provides temporary storage for the data and programming instructions when executed by the processor 902. I/O ports 920 are one or more serial and/or parallel communication ports that provide communication between additional peripheral devices, which may be coupled to the hardware system 900.

The hardware system 900 may include a variety of system architectures and various components of the hardware system 900 may be rearranged. For example, cache memory 904 may be on-chip with the processor 902. Alternatively, the cache memory 904 and the processor 902 may be packed together as a "processor module," with processor 902 being referred to as the "processor core." Furthermore, certain embodiments of the present disclosure may neither require nor include all of the above components. For example, the peripheral devices shown coupled to the standard I/O bus 908 may couple to the high performance I/O bus 906. In addition, in some embodiments, only a single bus may exist, with the components of the hardware system 900 being coupled to the single bus. Furthermore, the hardware system 900 may include additional components, such as additional processors, storage devices, or memories.

An operating system manages and controls the operation of the hardware system 900, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method, comprising:
   generating a game user interface that displays a virtual game environment in which is located multiple virtual objects that includes one or more objects that support a first game action and one or more objects that support a second, different game action;
   detecting activation of a selection input while a game pointer is located over a first one of the multiple virtual objects;
   determining that the first virtual object supports the first game action,
   performing the first game action on the first virtual object; and
   in an automated operation using one or more processors, activating a game action sweep mode to occur until a deactivation of the selection input, the game action sweep mode comprising:
     detecting that the game pointer is located over a second one of the multiple virtual objects, the first virtual object comprising a different type of object than the second virtual object;
     determining that the second virtual object supports the first game action, and, responsive thereto, performing the game action on the second virtual object;
     detecting that the game pointer is located over a third one of the multiple virtual objects, the third virtual object supporting the second game action; and
     determining that the third virtual object does not support the first game action, and, responsive thereto, performing no game action on the third virtual object during the game action sweep mode, such that game state information remains unchanged responsive to movement of the game pointer over the third virtual object during the game action sweep mode.

2. The computer-implemented method of claim 1, wherein detecting activation of a selection input comprises:
 receiving an indication of the activation of the selection input based on receipt of contact on a touch screen under which the virtual game environment is displayed.

3. The computer-implemented method of claim 2, further comprising:
 detecting the deactivation of the selection input in response to receiving an indication of a termination of the contact on the touch screen.

4. The computer-implemented method of claim 2, wherein detecting activation of a selection input while a game pointer is located over a first virtual object in a virtual game environment comprises:
 determining a placement of the contact on the touch screen is within a threshold distance from a display location of the first virtual object.

5. The computer-implemented method of claim 1, wherein performing the first game action on the first virtual object comprises:
 updating the state of the first virtual object to reflect a first performance of the first game action on the first virtual object; and
 wherein performing the first game action on the second virtual object comprises:
 updating a state of the second virtual object to reflect a second performance of the first game action on the second virtual object.

6. The computer-implemented method of claim 1, wherein performing no game action on the third virtual object comprises maintaining a current state of the third virtual object.

7. A non-transitory machine-readable storage medium storing instructions which, when executed by one or more processors, cause the one or more processors to perform operations comprising:
 generating a game user interface that displays a virtual game environment in which is located multiple virtual objects that includes one or more objects that support a first game action and one or more objects that support a second, different game action;
 detecting activation of a selection input while a game pointer is located over a first one of the multiple virtual objects;
 determining that the first virtual object supports the first game action;
 performing the first game action on the first virtual object; and
 activating a game action sweep mode to occur until a deactivation of the selection input, the game action sweep mode comprising:
  detecting that the game pointer is located over a second one of the multiple virtual objects, the first virtual object comprising a different type of object than the second virtual object;
  determining that the second virtual object supports the first game action, and, responsive thereto, performing the game action on the second virtual object;
  detecting that the game pointer is located over a third one of the multiple virtual objects, the third virtual object supporting the second game action; and
  determining that the third virtual object does not support the first game action, and, responsive thereto, performing no game action on the third virtual object during the game action sweep mode, such that game state information remains unchanged responsive to movement of the game pointer over the third virtual object during the game action sweep mode.

8. The machine-readable storage medium of claim 7, wherein detecting activation of a selection input comprises:
 receiving an indication of the activation of the selection input based on receipt of contact on a touch screen under which the virtual game environment is displayed.

9. The machine-readable storage medium of claim 8, further comprising:
 detecting the deactivation of the selection input in response to receiving an indication of a termination of the contact on the touch screen.

10. The machine-readable storage medium of claim 8, wherein detecting activation of a selection input while a game pointer is located over a first virtual object in a virtual game environment comprises:
 determining a placement of the contact on the touch screen is within a threshold distance from a display location of the first virtual object.

11. The machine-readable storage medium of claim 7, wherein performing the game action on the first virtual object comprises:
 updating the state of the first virtual object to reflect a first performance of the first game action on the first virtual object; and
 wherein performing the first game action on the second virtual object comprises:
 updating a state of the second virtual object to reflect a second performance of the first game action on the second virtual object.

12. The machine-readable storage medium of claim 8, wherein performing no game action on the third virtual object comprises maintaining a current state of the third virtual object.

13. A computer system comprising:
 a processor;
 a memory device holding an instruction set executable on the processor to cause the computer system to perform operations comprising:
  generating a game user interface that displays a virtual game environment in which is located multiple virtual objects that includes one or more objects that support a first game action and one or more objects that support a second, different game action;
  detecting activation of a selection input while a game pointer is located over a first one of the multiple virtual objects;
  determining that the first virtual object supports the first game action;
  performing the first game action on the first virtual object; and
  activating a game action sweep mode to occur until a deactivation of the selection input, the game action sweep mode comprising:
   detecting that the game pointer is located over a second one of the multiple virtual objects, the first virtual object comprising a different type of object than the second virtual object;
   determining that the second virtual object supports the first game action, and, responsive thereto, performing the game action on the second virtual object;
   detecting that the game pointer is located over a third one of the multiple virtual objects, the third virtual object supporting the second game action; and
   determining that the third virtual object does not support the first game action, and, responsive thereto, performing no game action on the third virtual object during the game action sweep mode, such that game state information remains unchanged responsive to movement of the game pointer over the third virtual object during the game action sweep mode.

14. The computer system of claim 13, wherein detecting activation of a selection input comprises:
receiving an indication of the activation of the selection input based on receipt of contact on a touch screen under which the virtual game environment is displayed.

15. The computer system of claim 14, further comprising:
detecting the deactivation of the selection input in response to receiving an indication of a termination of the contact on the touch screen.

16. The computer system of claim 15, wherein detecting activation of a selection input while a game pointer is located over a first virtual object in a virtual game environment comprises:
determining a placement of the contact on the touch screen is within a threshold distance from a display location of the first virtual object.

17. The computer system of claim 13, wherein performing the first game action on the first virtual object comprises:
updating the state of the first virtual object to reflect a first performance of the first game action on the first virtual object; and
wherein performing the first game action on the second virtual object comprises:
updating a state of the second virtual object to reflect a second performance of the first game action on the second virtual object.

* * * * *

UNITED STATES PATENT AND TRADEMARK OFFICE
CERTIFICATE OF CORRECTION

| | | |
|---|---|---|
| PATENT NO. | : 10,232,250 B2 | Page 1 of 1 |
| APPLICATION NO. | : 14/332914 | |
| DATED | : March 19, 2019 | |
| INVENTOR(S) | : Omi et al. | |

It is certified that error appears in the above-identified patent and that said Letters Patent is hereby corrected as shown below:

In the Specification

Column 4, Line 61, delete "302" and insert --304-- therefor

Column 4, Line 64, delete "302." and insert --304.-- therefor

Column 7, Line 6, delete "542" and insert --302-- therefor

Column 8, Line 35, delete "304" and insert --302-- therefor

In the Claims

Column 18, Line 44, in Claim 1, delete "action," and insert --action;-- therefor Column 20, Line 3, in Claim 8, after "The", insert --non-transitory--

Column 20, Line 8, in Claim 9, after "The", insert --non-transitory--

Column 20, Line 13, in Claim 10, after "The", insert --non-transitory--

Column 20, Line 20, in Claim 11, after "The", insert --non-transitory--

Column 20, Line 31, in Claim 12, after "The", insert --non-transitory--

Column 20, Line 31, in Claim 12, delete "claim 8," and insert --claim 7,-- therefor Signed and Sealed this
Twenty-first Day of April, 2020

Andrei Iancu
*Director of the United States Patent and Trademark Office*